Patented Jan. 15, 1929.

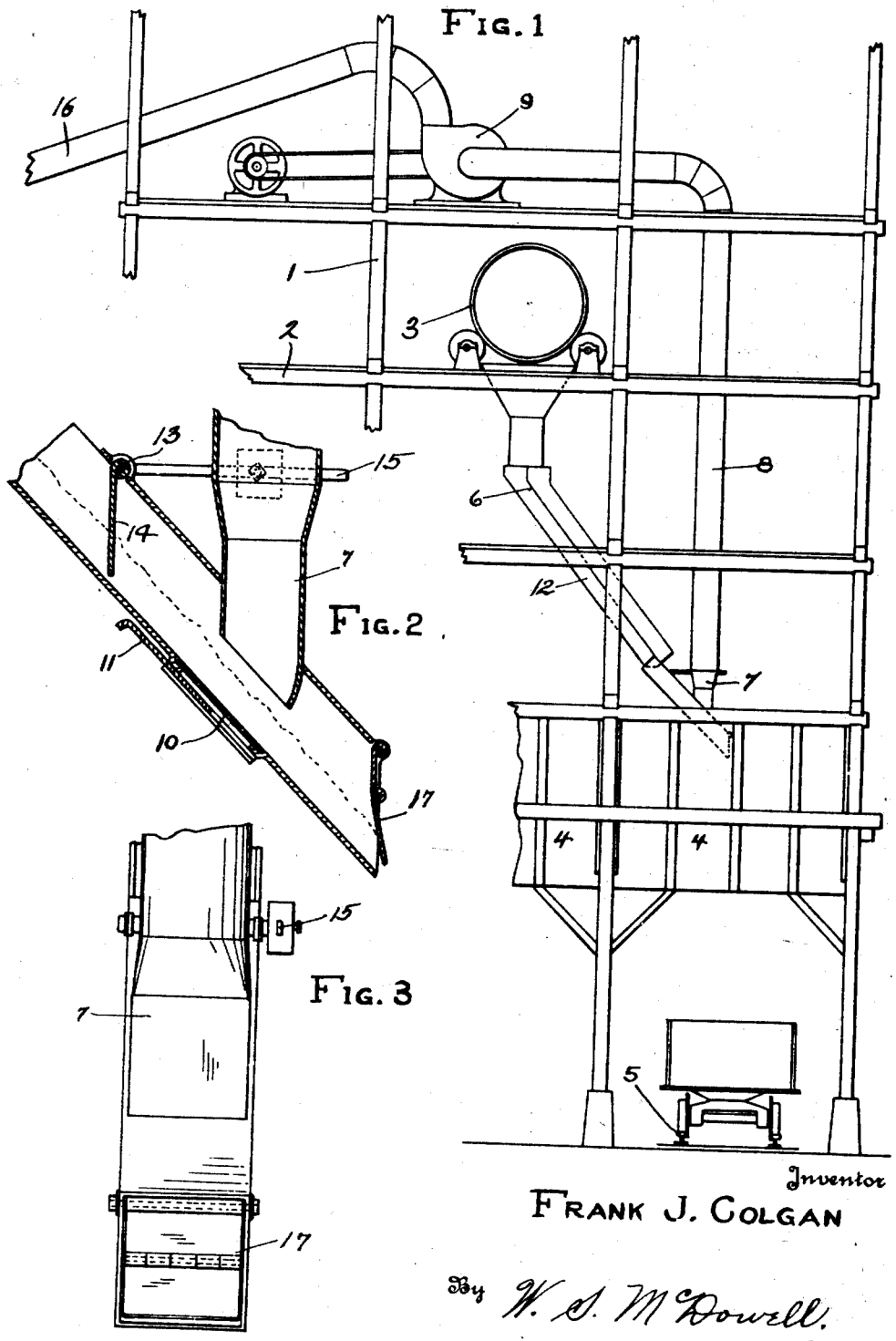

1,699,180

UNITED STATES PATENT OFFICE.

FRANK J. COLGAN, OF COLUMBUS, OHIO.

APPARATUS FOR REMOVING DUST FROM STONE CRUSHING AND SEGREGATING APPARATUS.

Application filed February 9, 1927. Serial No. 167,036.

This invention relates to improvements in stone crushing and assorting apparatus and has for its primary object the provision of means for producing cleaner and better sized portions of rock or stone by collecting the stone dust and loose particles released from the stones during the passage of the latter from the screening means to the bins or hoppers in which the stone is collected and subsequently delivered to suitable carriers. This stone dust or fine screenings possesses certain commercial value, and in the operation of ordinary crushing and separating apparatus this dust or fine screenings becomes mixed with the larger sizes of stone, in which it has no place, and its value is lost. Therefore, in accordance with the present invention there is provided suction apparatus, situated between the screening and hopper means, by which during the travel of the stone between said means, the said suction apparatus serves to collect the lighter mineral particles and to remove the same from the main body of stone to a separate collecting and storing agency, permitting of the segregation of such stone dust or lighter mineral particles and the separate sale and disposal thereof, thereby eliminating waste and the commingling of the dust with crushed stone of larger sizes.

For a further understanding of the invention reference is to be had to the following description and the accompanying drawing, wherein:

Figure 1 is a side elevation of a stone crushing plant constructed to utilize the features of the present invention, Figure 2 is an enlarged vertical sectional view of the collecting hood and chute of the suction apparatus, Figure 3 is a front elevation of the parts disclosed in Figure 2.

Referring more particularly to the drawings the numeral 1 designates a stone crushings plant generally. The plant is formed to include the usual elevated frame structure 2, which supports, contiguous to the upper portion thereof, any suitable type of screening means 3, consisting of reciprocatory, vibratory or rotary screens in which the crushed stone to be sized or assorted is deposited and by the usual operation of the screens is delivered in segregated form, according to the size of the stone, into the underlying bins 4 or other places of deposit disposed over for example tracks or vehicle thoroughfares 5, or a delivery conveyor means.

The stone is conducted from the screens 3 into the bins 4 by means of a gravity chute 6, and it is the purpose of the present invention to provide means in connection with these chutes for collecting the stone dust particles and to remove the same automatically and economically from the larger bodies of stone while the latter are travelling from the screens to the bins by way of said chutes, the stone dust being delivered to a separate collecting agency and sold or distributed as a separate or distinct commodity.

A simple method of attaining this end, which I have used in practical operation, is to provide above each of said chutes, at a point intermediate the length thereof a contiguous suction hood or nozzle 7, which communicates with a conduit 8 leading upwardly to a power driven blower unit 9 mounted on the top, preferably, of the frame structure 2. The open lower end of the hood or nozzle 7 is provided with a beveled surface cut to conform with the angularity in position which the chute 6 assumes when in operation, and is slightly spaced from a wire mesh screen 10, the latter being coverable through the provision of a slidable plate 11 carried by the bottom of the chute. The chute itself preferably includes a fixed receiving portion within which is hinged as at 13 a movable door section 14, there being a weighted arm 15 connected with the hinge 13 in offset relationship so as to maintain the movable section in its normal position of operation but to permit of momentary variation in such position.

It will be seen that as the stone travels down the chute, the flying dust particles attending this operation will be caught in the suction conduit 7 and 8, and under the action of the blower unit 9 these particles may be forced through one or more discharge conduits 16 and deposited in piles, bins, conveyors or mounds where the stone particles may be stored or handled for future and separate use.

At the lower or discharge end of the chute there is provided a swinging door 17, preferably formed to include two hingedly connected sections. Normally the door 17 responds to the influence of gravity and maintains the chute in a closed position. It will be seen that through the medium of the door constructions 14 and 17 means have been provided for confining the stone dust within a limited zone of the chute and to also render the operation of the suction collecting nozzle more effective. Thus the air drawn in by the nozzle passes in the main through the screen 10, and the effective area of this screen is in turn regulated by the door 11. The doors 14 and 17 may respond to the influence of the travelling stone on the bottom of the chute and assume more or less elevated positions engaging with the upper surfaces of said stone, but at all times said doors serve to limit the suction zone of the chute so that a draught of appreciable proportions to the chute is effected to thoroughly withdraw lighter stone dust or particles.

What is claimed is:

1. In a stone crushing plant, an inclined stone discharge chute, the bottom of said chute being provided with an opening, an adjustable closure for regulating the effective area of said opening, swinging closures for the ends of the confined portion of said chute, the upper of said closures being weighted so as to exert a checking and an agitating action upon the material passing through said chute, and a suction nozzle entering said chute and located between said swinging closures.

2. In stone handling apparatus, a substantially closed inclined chute, said chute being provided with an air opening, a movable plate for controlling the effective area of said opening, a suction nozzle entering the closed zone of said conduit, a movable closure at each end of said closed zone, and adjustable means formed with the upper of said closures for limiting the entrance passage for the material passing through said chute.

In testimony whereof I affix my signature.

FRANK J. COLGAN.